(12) United States Patent
Houle

(10) Patent No.: US 11,052,879 B2
(45) Date of Patent: Jul. 6, 2021

(54) APPARATUS AND METHODS FOR POWERED TRAILER DOLLIES

(71) Applicant: Parkit360 Inc., Carleton Place (CA)

(72) Inventor: Stephen Houle, Carleton Place (CA)

(73) Assignee: Parkit360 Inc., Ontario (CA)

( * ) Notice: Subject to any disclaimer, the term of this patent is extended or adjusted under 35 U.S.C. 154(b) by 278 days.

(21) Appl. No.: 16/225,952

(22) Filed: Dec. 19, 2018

(65) Prior Publication Data

US 2020/0198596 A1    Jun. 25, 2020

(51) Int. Cl.
| | |
|---|---|
| *B60S 9/215* | (2006.01) |
| *B60S 9/18* | (2006.01) |
| *B62D 53/08* | (2006.01) |
| *B60D 1/66* | (2006.01) |

(52) U.S. Cl.
CPC .............. *B60S 9/215* (2013.01); *B60D 1/665* (2013.01); *B60S 9/18* (2013.01); *B62D 53/0864* (2013.01)

(58) Field of Classification Search
CPC . B60D 1/665; B60S 9/215; B60S 9/18; B60S 9/21; B60S 13/00; B62D 61/10; B62D 53/0864; B62D 1/283; B62D 61/125; B62D 61/12; B62B 5/0079; B62B 5/0076; B62B 5/0083
USPC ........................................................ 180/904
See application file for complete search history.

(56) References Cited

U.S. PATENT DOCUMENTS

| | | | | |
|---|---|---|---|---|
| 1,623,298 A | * | 4/1927 | Bell ...................... | B62B 5/0083 280/47.16 |
| 3,166,141 A | * | 1/1965 | Shields ................ | B62D 49/007 180/21 |
| 3,370,666 A | * | 2/1968 | Holtzclaw .......... | B62D 53/0864 180/213 |
| 3,799,362 A | * | 3/1974 | Oswald .................. | B62D 61/10 414/680 |
| 4,101,004 A | * | 7/1978 | Oltman .................. | B62D 11/08 180/6.2 |

(Continued)

FOREIGN PATENT DOCUMENTS

| | | | | |
|---|---|---|---|---|
| CH | 259630 A | * | 1/1949 | ............. B62D 49/06 |
| WO | WO-0238435 A1 | * | 5/2002 | ........... B62D 31/006 |

(Continued)

OTHER PUBLICATIONS

"Bigfoot 6 Wheel Jet Ski Dolly—Florida Sailcraft—Jet Ski Beach Trailers Florida Sailcraft", 4 pages, downloaded on Dec. 17, 2018 from https://floridasailcraft.com/product/bigfoot-6-wheel-jet-ski-dolly/.

(Continued)

*Primary Examiner* — Ruth Ilan
*Assistant Examiner* — Myles A Harris
(74) *Attorney, Agent, or Firm* — Barlow, Josephs & Holmes, Ltd.

(57) ABSTRACT

Power dollies can be used for moving moveable objects such as trailers. A power dolly could include a frame, a mount and a plurality of wheel sets. The mount could couple the power dolly to a moveable object. One or more of the plurality of wheels sets could be powered. The plurality of wheels sets could be separated into a primary wheel set and one or more support wheel sets. The wheels of the primary wheel set could extend farther from the frame that the wheels of the support wheel sets.

22 Claims, 8 Drawing Sheets

(56) References Cited

U.S. PATENT DOCUMENTS

| | | | | |
|---|---|---|---|---|
| 4,407,381 | A | * | 10/1983 | Oswald .............. B60K 17/342 180/24.12 |
| 4,572,311 | A | * | 2/1986 | Oswald .............. B60K 7/0007 180/24.05 |
| 4,632,194 | A | * | 12/1986 | Averill ................ B62D 49/08 173/28 |
| 4,941,676 | A | * | 7/1990 | Kopczynski ......... B60K 17/32 280/124.129 |
| 4,993,912 | A | * | 2/1991 | King .................... B25J 5/007 180/8.2 |
| 5,083,625 | A | * | 1/1992 | Bleicher .............. B62D 61/10 180/202 |
| 5,323,867 | A | * | 6/1994 | Griffin ................. B25J 5/007 180/22 |
| 5,938,217 | A | * | 8/1999 | Wintz .................. B62B 3/008 280/35 |
| 6,206,385 | B1 | * | 3/2001 | Kern .................... B62B 3/02 280/47.35 |
| 7,290,782 | B2 | * | 11/2007 | Brown ................. B60D 1/58 280/476.1 |
| D876,041 | S | * | 2/2020 | Wiskus ................ B60B 30/10 D34/23 |
| 2007/0108716 | A1 | * | 5/2007 | Scruggs ............... B60C 19/001 280/124.117 |
| 2014/0054098 | A1 | * | 2/2014 | Ferri .................... B60D 1/06 180/14.1 |

FOREIGN PATENT DOCUMENTS

| | | | | |
|---|---|---|---|---|
| WO | WO-0246031 | A1 | * | 6/2002 ........... B60B 19/003 |
| WO | WO-2005039956 | A2 | * | 5/2005 ............... B64G 1/16 |
| WO | WO-2017076806 | A1 | * | 5/2017 ............... B60G 5/00 |

OTHER PUBLICATIONS

"Trailer Valet RVR—Trailer Valet", 5 pages, downloaded on Dec. 17, 2018 from https://trailervalet.com/shop/rvr/.

* cited by examiner

APPARATUS AND METHODS FOR POWERED TRAILER DOLLIES

BACKGROUND

This application relates generally to powered trailer dollies.

Trailers are moveable objects that are designed to carry various loads. The weight of a typical trailer, and/or the contents carried by the trailer, often makes it impractical or impossible for a user to move the trailer without the aid of a powered device. Many trailers are designed to be towed by motorized vehicles such as cars and trucks. However, towing a trailer can present challenges. For example, it can be difficult to maneuver a trailer into tight locations where there is little clearance for the trailer and/or the motorized vehicle towing the trailer. In addition, aligning and connecting a motorized vehicle to a trailer can be difficult for a user to perform on their own without the assistance of another person, a camera, or some other form of visual aid.

SUMMARY

According to one aspect of the present disclosure, there is provided a power dolly including: a frame including a first end, a second end, a first side and a second side; a mount, coupled to the frame, to couple the power dolly to a movable object; and a plurality of powered wheel sets, coupled to the frame, to provide drive to the power dolly, the plurality of powered wheel sets including: a primary wheel set coupled to the frame between the first end and the second end, a first support wheel set coupled to the frame toward the first end of the frame relative to the primary wheel set, and a second support wheel set coupled to the frame toward the second end of the frame relative to the primary wheel set.

In some embodiments, the primary wheel set extends farther from the frame than the first support wheel set and the second support wheel set.

In some embodiments, the primary wheel set includes a first wheel coupled toward the first side of the frame relative to the mount and a second wheel coupled toward the second side of the frame relative to the mount. The power dolly could include a first motor to provide power to the first wheel and a second motor to provide power to the second wheel.

In some embodiments, the first support wheel set includes a first wheel coupled toward the first side of the frame relative to the mount and a second wheel coupled toward the second side of the frame relative to the mount. The power dolly could also include a first motor to provide power to the first wheel and a second motor to provide power to the second wheel. The second support wheel set could include a third wheel and a fourth wheel, the third wheel being coupled toward the first side of the frame relative to the mount and being powered by the first motor, the fourth wheel being coupled toward the second side of the frame relative to the mount and being powered by the second motor.

In some embodiments, the power dolly further includes a tow hitch coupled to the mount, where the moveable object includes a trailer.

In some embodiments, the plurality of powered wheel sets includes tires.

According to another aspect of the present disclosure, there is provided a power dolly including: a frame including a first end, a second end, a first side and a second side; a mount, coupled to the frame, to couple the power dolly to a movable object; and a plurality of wheel sets coupled to the frame, the plurality of wheel sets including: a powered primary wheel set, coupled to the frame between the first end and the second end, to provide drive to the power dolly, a first support wheel set coupled to the frame toward the first end of the frame relative to the primary wheel set, and a second support wheel set coupled to the frame toward the second end of the frame relative to the primary wheel set, where the primary wheel set extends farther from the frame than the first support wheel set and the second support wheel set.

In some embodiments, the primary wheel set is mounted farther from the frame than the first support wheel set and the second support wheel set.

In some embodiments, each of the primary wheel set, the first support wheel set and the second support wheel set includes one or more wheels, the one or more wheels of the primary wheel set having a larger diameter than the one or more wheels of the first support wheel set and the second support wheel set.

In some embodiments, the power dolly includes an adjustable-height coupling to couple the primary wheel set to the frame. The adjustable-height coupling could include a manually adjustable coupling, and/or a powered adjustable coupling.

According to yet another aspect of the present disclosure, there is provided a method including: providing a frame for a power dolly, the frame including a first end, a second end, a first side and a second side; providing a mount to couple the power dolly to a movable object; providing a plurality of powered wheel sets to provide drive to the power dolly, the plurality of powered wheel sets including: a primary wheel set coupled to the frame between the first end and the second end, a first support wheel set coupled to the frame toward the first end of the frame relative to the primary wheel set, and a second support wheel set coupled to the frame toward the second end of the frame relative to the primary wheel set.

Other aspects and features of embodiments of the present disclosure will become apparent to those ordinarily skilled in the art upon review of the following description.

BRIEF DESCRIPTION OF THE DRAWINGS

For a more complete understanding of the present disclosure, reference is now made to the following description taken in conjunction with the accompanying drawings, in which.

DETAILED DESCRIPTION

Figure 1:
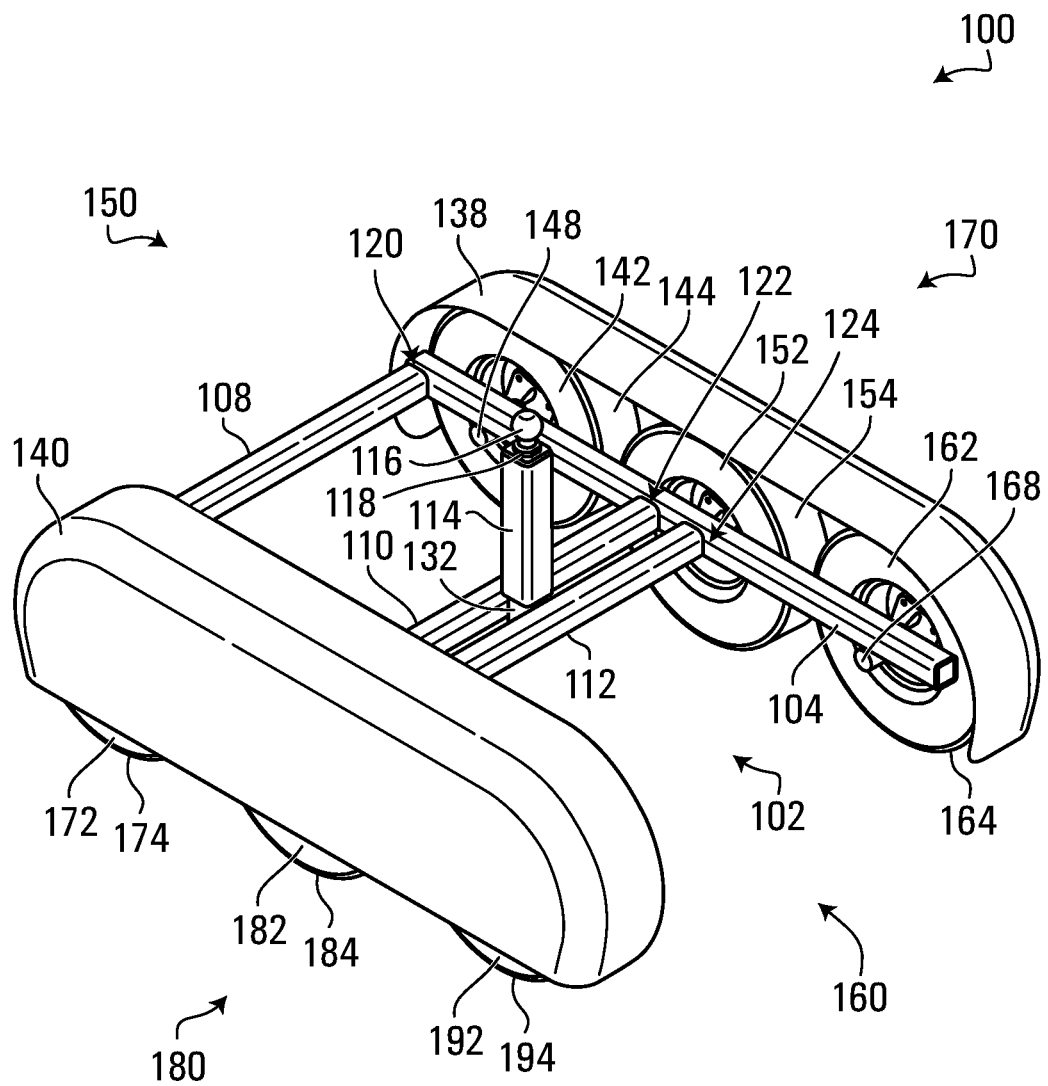
FIG. 1 is an isometric view of an example power dolly viewed from the top.

The present disclosure relates, in part, to powered trailer dollies or power dollies for moving trailers. A "power dolly" as referenced herein is a powered device to assist in the movement of moveable objects such as trailers. In some situations, power dollies could provide a more convenient means of moving a trailer or other object, and could be particularly useful in space-limited and/or visibility-limited applications in which use of a vehicle is not convenient or not possible.

In general, the embodiments described herein could provide power dollies for moving any type of movable object, and not just trailers. A moveable object could be supported, at least in part, by wheels, tracks, skis, sliders, and/or other support means. In some embodiments, the movable object could be unpowered, although this might not always be the case. For example, a motorized vehicle could be moved using a power dolly by shifting the transmission of the motorized vehicle into neutral.

Although many embodiments disclosed herein refer to wheeled trailers, it should be appreciated that wheeled trailers represent an illustrative and non-limiting example of movable objects that could be moved with a power dolly.

A moveable object could include a device or apparatus for connecting to a coupling point on a power dolly. In the case of a trailer, the coupling point on the power dolly could include a tow hitch, and the means of connection on the trailer could include a trailer coupler. Examples of trailer couplers include trailer ball couplers, gooseneck couplers and fifth-wheel couplers. A power dolly could also or instead couple to other components of a trailer, such as the frame, wheel(s) and/or a jack, for example.

A trailer or other moveable object need not necessarily be modified to enable it to be used with a power dolly. However, in some embodiments, a trailer could be modified to couple to a power dolly. For example, a gooseneck coupler could be extended using an adaptor to reach the coupling point on a power dolly. Stabilization bars could also or instead be implemented to provide additional stability between a power dolly and a trailer. In the example of a gooseneck coupler, stabilization bars between the gooseneck coupler and the frame of the trailer could improve rigidity and stability of the power dolly relative to the trailer.

Although power dollies must move the weight of an object, a power dolly could weigh much less than at least some objects, such as many trailers. In addition, not all of the weight of a trailer is supported by a power dolly that couples to the tongue of a trailer, for example. In some cases, only 10% of the weight of a trailer is transferred to and supported by the power dolly, and the remaining 90% of the trailer weight is supported by trailer supports such as wheels of the trailer. The weight that is supported by the power dolly could be important for generating traction, between wheels of the power dolly and the ground, for example. Thus, by supporting the majority of the trailer weight, the wheels of a trailer could divert traction away from a power dolly, yet the wheels of the trailer are unpowered and do not provide any additional drive to move the trailer. This could result in a reduction in traction and/or stability for the power dolly. Such weight distribution and traction effects could also apply to other types of trailer supports than wheels and/or other types of movable objects than trailers.

Some power dollies include two powered wheels, and any additional support wheels are unpowered. These unpowered support wheels could also reduce the stability and/or traction for the power dolly. For example, unpowered support wheels on a power dolly could support some of the weight that is transferred to the power dolly, without providing any additional drive to the power dolly. Thus, the unpowered support wheels could divert traction away from the powered wheels of the power dolly. The loss of traction could lead to the powered wheels of the power dolly spinning in place without moving a coupled object such as a trailer. The power dolly could also or instead lose stability, leading to the power dolly moving undesirably relative to the object. For example, a power dolly could be moved from underneath a coupling point of a trailer and/or one or more wheels of the power dolly could be lifted off of the ground, into a "wheelie" position. Such loss of stability in a power dolly could potentially be unsafe for a user.

Some embodiments described herein relate to power dollies with powered support wheels. Advantageously, the powered support wheels could provide additional drive to the power dolly in comparison with a power dolly that has unpowered support wheels. Powered support wheels could also or instead counteract or reduce the traction loss effect of unpowered support wheels in that any weight that is supported by powered support wheels increases the traction of those wheels. This could provide improved overall traction for the power dolly. In other words, while the powered support wheels might divert traction away from other powered wheels of the power dolly, this traction is still used to move the power dolly. The stability of the power dolly could also be improved with powered support wheels, improving user safety for the power dolly. For example, powered support wheels could prevent the power dolly from being pulled underneath a trailer or otherwise moved from underneath a coupling point.

Support wheels, whether powered or unpowered, could potentially hinder a power dolly's ability to turn and/or pivot. Some power dollies use differential steering, also known as skid steering, to turn or pivot. Differential steering involves turning wheels on opposite sides of the power dolly at different speeds and/or in different directions. If a power dolly with support wheels is turned or pivoted using differential steering, then the support wheels could drag or skid across the ground, increasing steering resistance.

Some embodiments described herein relate to power dollies with center or primary wheels that are lowered relative to support wheels. These lowered center wheels could carry more trailer weight, and thus divert some weight and/or traction away from the support wheels. As a result, the support wheels could create less drag when the power dolly is turned or pivoted, potentially making the power dolly more maneuverable.

For illustrative purposes, specific example embodiments will be explained in greater detail below in conjunction with the figures. It should be appreciated, however, that the present disclosure provides many applicable concepts that could be embodied in any of a wide variety of specific contexts. The specific embodiments discussed are merely illustrative and do not limit the scope of the present disclosure. For example, embodiments could include additional, different, or fewer features than shown in the drawings. The figures are also not necessarily drawn to scale.

Figure 2:
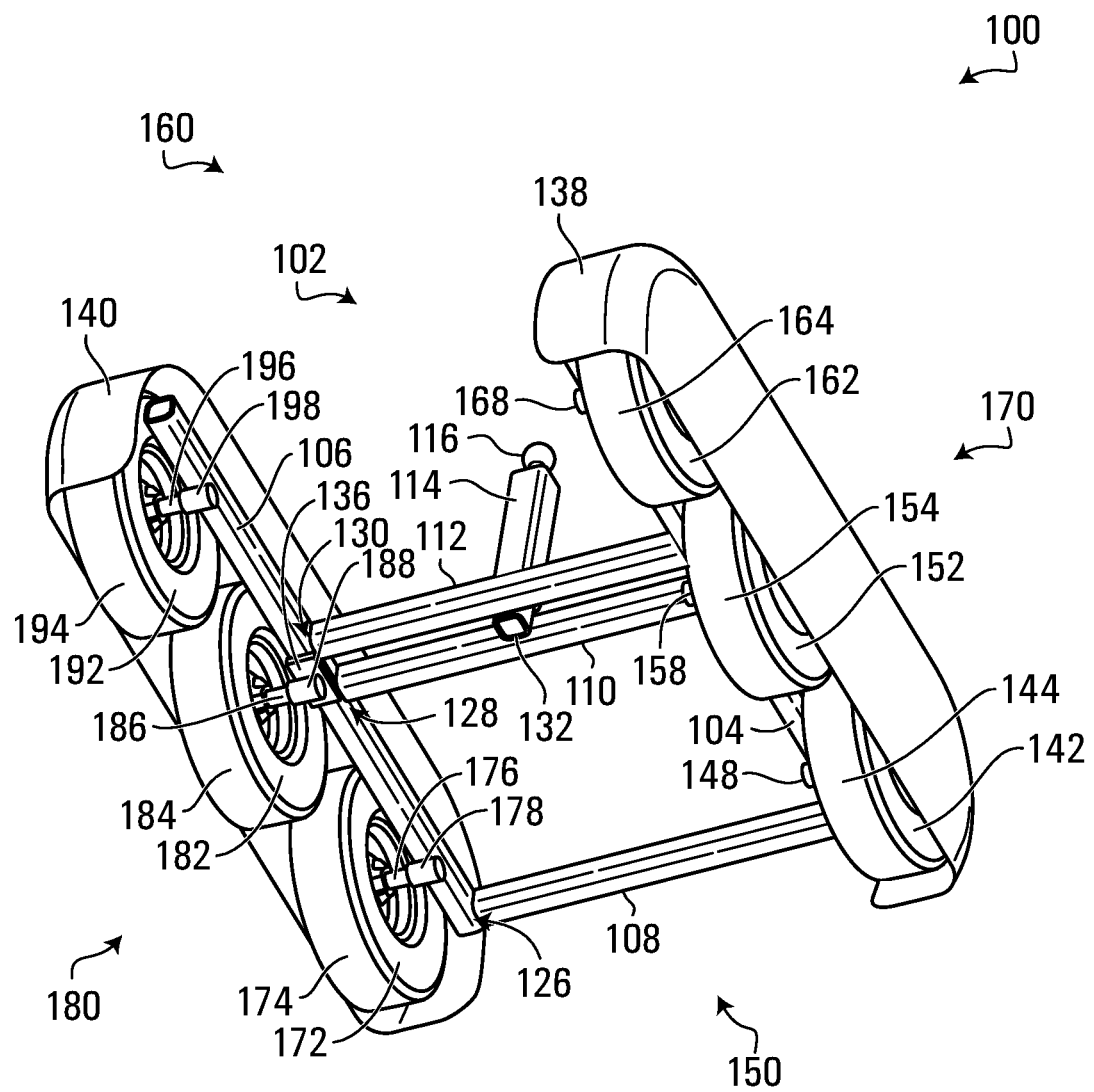
FIG. 2 is an isometric view of the power dolly in FIG. 1 viewed from the bottom.
Figure 3:
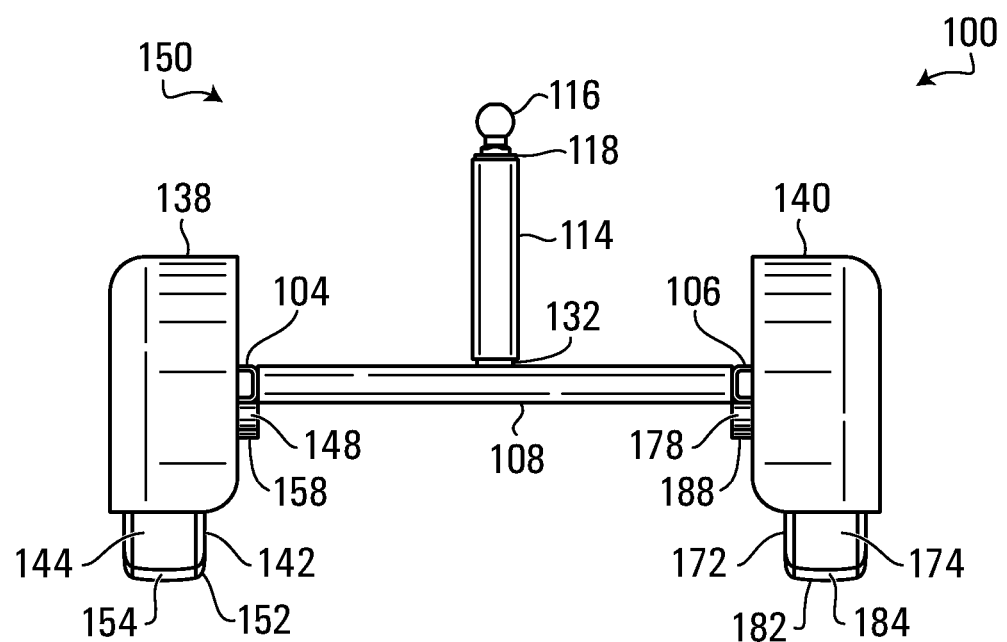
FIG. 3 is a plan view of the power dolly in FIG. 1 viewed from an end.
Figure 4:
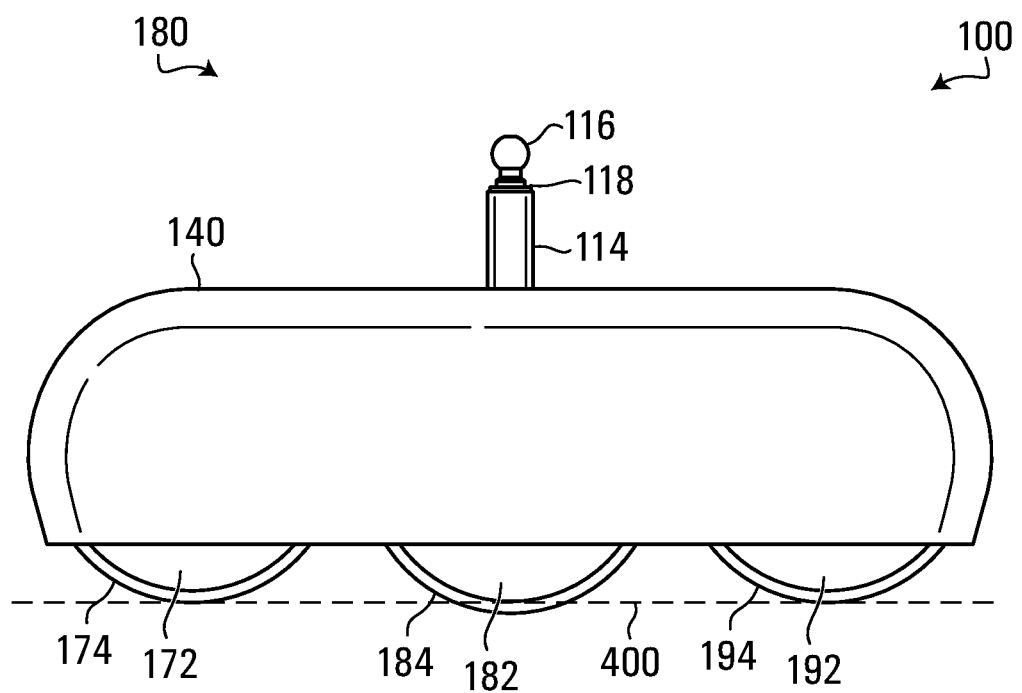
FIG. 4 is a plan view of the power dolly in FIG. 1 viewed from a side.
Figure 5:
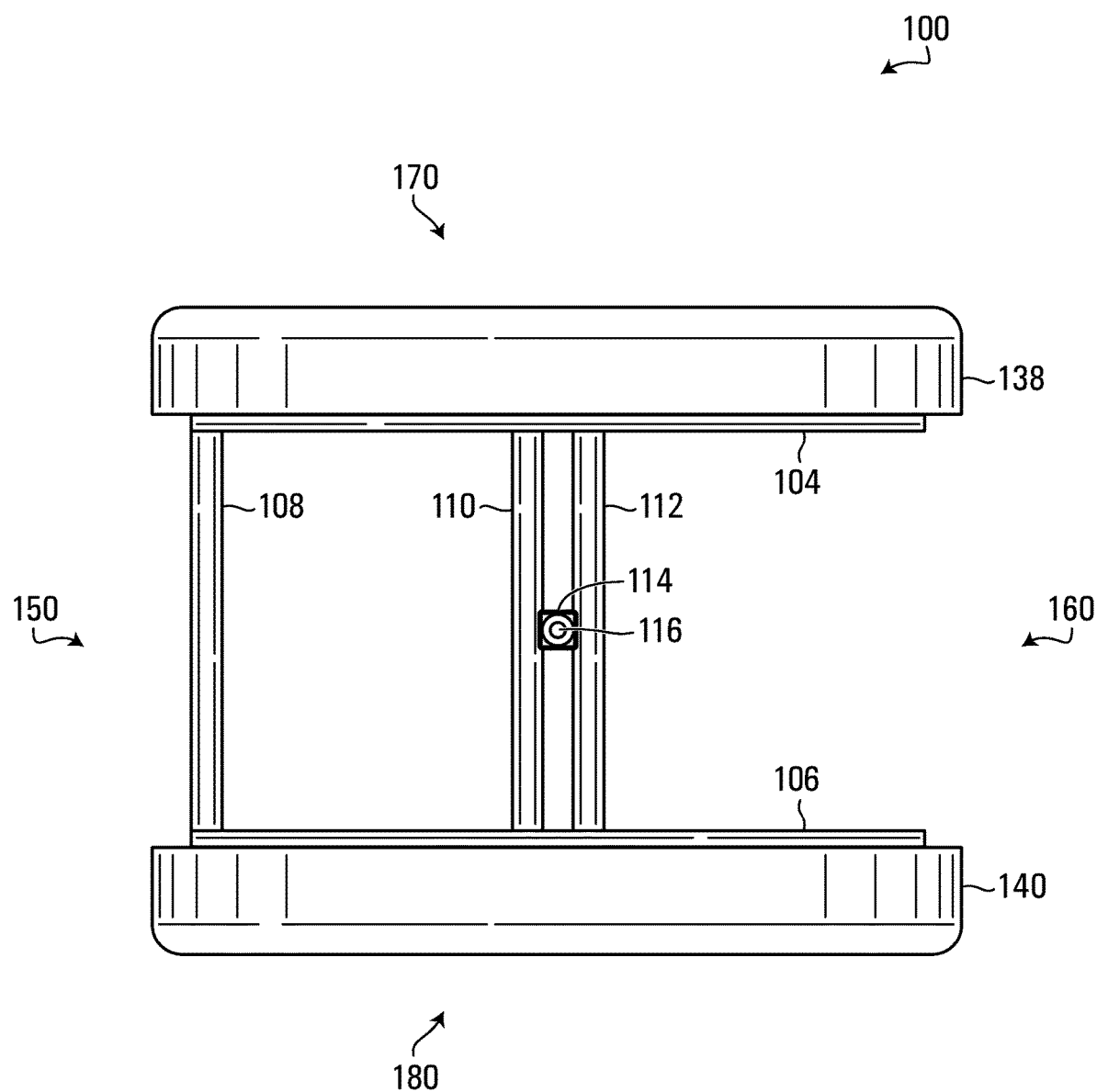
FIG. 5 is a plan view of the power dolly in FIG. 1 viewed from the top.
Figure 6:
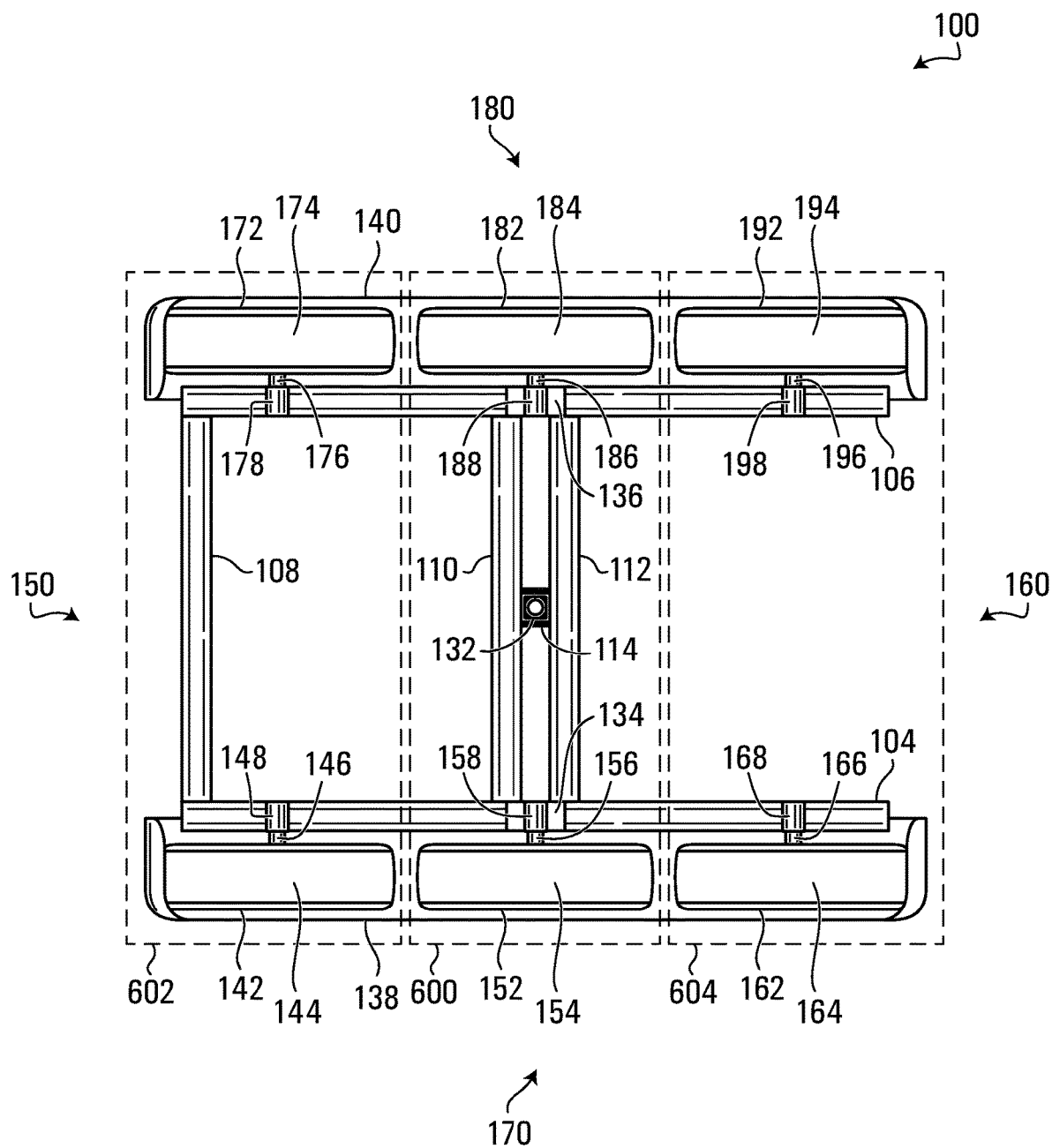
FIG. 6 is a plan view of the power dolly in FIG. 1 viewed from the bottom.

FIG. 1 is an isometric view of an example power dolly 100 viewed from the top, FIG. 2 is an isometric view of the power dolly 100 viewed from the bottom, FIG. 3 is a plan view of the power dolly 100 viewed from an end, FIG. 4 is a plan view of the power dolly 100 viewed from a side, FIG. 5 is a plan view of the power dolly 100 viewed from the top, and FIG. 6 is a plan view of the power dolly 100 viewed from the bottom. Various features referenced in the description below are shown in one or more of these drawings.

The power dolly 100 could be considered a simplified example of a power dolly. Although the power dolly 100 could include many other components in addition to those illustrated in FIGS. 1 to 6, these components are not shown, in an effort to avoid congestion in these drawings and to clearly show structural components of the illustrated embodiment. Possible additional components include, for example, motors, batteries, controllers, chain drives, wheel sprockets and chain tensioners. These components, as well as others, are discussed elsewhere herein.

The power dolly 100 includes a frame 102 having two ends 150, 160 and two sides 170, 180. The frame 102 includes a member 104, extending between the ends 150, 160, that is provided toward the side 170 relative to the center of the frame. The frame 102 also includes a member 106, extending between the ends 150, 160, that is provided toward the side 180 relative to the center of the frame. Two members 110, 112, extending between the sides 170, 180, are provided toward the center of the frame 102 relative to the ends 150, 160. The shape/arrangement of frame 102 could generally be referred to as an "H-frame". In the example shown, the frame 102 further includes a member 108, extending between the sides 170, 180, that is provided toward the end 150 relative to the center of the frame. The member 108 is illustrative of other members that could be implemented in some embodiments, to provide additional frame strength and/or support for other power dolly components in an H-frame based design.

The term "toward", as used herein, indicates the position of components relative to others, and does not define or imply how close any two components might be. For example, the member 106 could be toward the side 170 relative to the center of the frame simply by being closer to the side 170 than to the side 180. It is not required or implied that the member 106 is adjacent to the side 170. Further, the term "toward" is not an exclusive term. The member 106 being toward the side 170 could be only one component of a vector, which does not exclude the member being toward the ends 150, 160 relative to the center of the frame as well. This also applies to other components herein as well.

The shape of the frame 102 is generally rectangular. However, other embodiments include non-rectangular frames, examples of which include triangular, circular and oval frames. Regardless of the shape of a frame, all frames can generally be considered to have two ends and two sides. The terms "side" and "end", as used herein, are for ease of reference only and do not imply a certain shape or arrangement of a frame. Ends and sides could be determined based on any number of factors. For example, the location and/or orientation of certain components of a power dolly, such as the wheels, motors and/or mount, could define or delineate the location of the sides and the ends.

The members 104, 106, 108, 110, 112 could include rigid beams, shafts and/or bars to provide stiffness and rigidity to the frame 102. The members 104, 106, 108, 110, 112 could be made from metals or metal alloys such as steel or aluminum, for example. Other materials could also be used, such as wood, plastics and/or composite materials such as fiberglass.

The member 108 is coupled or connected to the members 104, 106 via respective connections 120, 126. Similarly, the member 110 is coupled or connected to the members 104, 106 via respective connections 122, 128, and the member 112 is coupled or connected to the members 104, 106 via respective connections 124, 130. These connections 120, 122, 124, 126, 128, 130 could be non-releasable. Examples of non-releasable connections include welds and/or rivets between two members. However, releasable connections are also possible. Releasable connections could include snap connections, pinned connections and/or threaded connections. Pinned connections could be formed using holes or bores in two members, which can be aligned to receive a pin. A pin could be a bolt, secured in place with a nut. Threaded connections could be formed using bolts and/or screws. The connections 120, 122, 124, 126, 128, 130 could all employ the same type of connection, or several different types of connection. Further, any one of the connections 120, 122, 124, 126, 128, 130 could employ multiple types of connection. For example, the connection 120 could be formed using welds and bolts. The connections 120, 122, 124, 126, 128, 130 could be rigid connections, but they could also permit at least some movement of two members relative to each other.

The frame 102 is an illustrative example of a frame for a power dolly. Other shapes and arrangements of frames are also contemplated. Some frames could have fewer members than frame 102. For example, a frame could be provided with the members 104, 106, 110, 112, but without the member 108. Some frames could instead have more members than frame 102. For example, a frame similar to the frame 102 could be provided with an additional member, extending between the sides 170, 180, that is provided towards the end 160 relative to the center of the frame. A frame could also or instead include members such as crossbraces, which are provided at angles relative to the sides and ends of the frame.

The lengths of the members 104, 106, 108, 110, 112 need not necessarily be fixed. For example, one or more of the members 104, 106, 108, 110, 112 could be telescopic or expandable. The members 106, 108 could be telescopic to change the length of the power dolly 100, and/or the members 108, 110, 112 could be telescopic to change with width of the power dolly. Telescopic members could include one or more stages of hollow beams or shafts, which are sized to fit inside of each other. These stages could controllably slide relative to each other to change the overall length of a member. The sliding could be manual, or it could be automated using hydraulic or pneumatic power, for example. The stages could be locked at a particular length and/or in a particular arrangement using pins, bolts and/or clamps, for example. Telescopic members could also or instead include beam or shaft sections that can be added or removed to change the overall length of the members. These beam or shaft sections could couple to a member using releasable engagements. Telescopic members could further include elements such as turn buckles, stretching screws and/or bottle screws. For example, a member could be divided into two sections, each with a threaded connection to receive a screw, and with one section having a left-hand thread and the other having a right hand-thread. A single screw could be used to couple these sections, where turning the screw in one direction brings the two sections closer together, and turning the screw in the other direction pushes the two sections further apart, thereby changing the length of the member.

In some implementations, the length and/or width of the power dolly 100 could be decreased, such as by using telescopic members, to reduce the footprint of the power dolly for storage or shipping or for maneuvering the power dolly within a limited physical space, for example. The length and/or width of the power dolly 100 could be increased, again by using the telescopic members in this example, to increase the footprint of the power dolly and provide additional stability during use. However, other configurations and implementations are also possible. For example, the frame 102 could include one or more hinges that allow the frame to be folded for storage or transport.

The power dolly 100 also includes a mount 132, coupled to the frame 102, to couple the power dolly to a moveable object. The mount 132 is an example of a bracket or receiver that can receive a tow hitch or post. The mount 132 is coupled or connected to one or both of the members 110, 112. These connection(s) could include a rigid connection to ensure that the mount 132 cannot move relative to the frame 102. The connection(s) could also be releasable or non-releasable. Examples of releasable and non-releasable connections are provided elsewhere herein.

The mount 132 connects to and supports a post 114. The post 114 could be considered a tow hitch for towing a trailer. Posts of different lengths may be desired for moving different types and sizes of trailers. Therefore, the connection between the mount 132 and the post 114 could include a releasable connection that allows the post 114 to be added, removed, and/or exchanged for other posts. The post 114 could be hollow, and the mount 132 could be a bar or shaft that is sized to fit inside or outside the post 114. The post 114 and the mount 132 could have holes or bores that, when aligned, receive a pin to connect the post and the mount. The mount 132 and post 114 could also or instead be connected using a threaded connection or other type of connection.

Non-releasable connections between the mount 132 and the post 114 are also contemplated. In some embodiments, the post 114 could be telescopic to increase or decrease in length. This could allow the post 114 to change in length when it is non-releasably connected to the mount 132, and therefore cannot be changed for a post of a different length. Examples of telescopic components are discussed elsewhere herein.

A trailer ball 116 is coupled, via a connection or coupling 118, to the distal end of the post 114 relative to the mount 132. The trailer ball 116 is an example of a coupling point for coupling to a moveable object. The trailer ball 116 could be used to couple to a trailer ball coupler or gooseneck coupler on a trailer. In other embodiments, other types of coupling points could be connected to a power dolly. For example, the post 114 could instead be connected to a pintle hook and/or a tow eye for coupling to corresponding types of trailer couplers. The post 114 could also or instead be coupled to a frame coupler, which is a bracket or receiver for connecting to the frame of a trailer. Using a frame coupler, the power dolly could couple to and move a trailer without being coupled directly to the trailer coupler. A frame coupler could include a bracket that supports a portion of the frame of a trailer, and straps and/or other elements to tie the bracket to the trailer frame and stabilize the trailer frame on the bracket. Using the frame coupler, the power dolly could move the trailer and align the trailer coupler above a hitch of a motorized vehicle, for example. The trailer could then be decoupled from the power dolly and lowered directly onto the hitch of the vehicle.

The connection 118 could be a releasable connection so that the trailer ball 116 can be added, removed, and/or exchanged for other types of coupling points to couple to different types of trailer couplers. For example, the trailer ball 116 could include a threaded, bolt-like, protrusion, and the post 114 could include a threaded hole to receive the threaded protrusion of the trailer ball 116. Therefore, the trailer ball 116 could be screwed onto and unscrewed from the post 114, allowing a user to add, remove and/or replace the trailer ball 116.

The mount 132, post 114 and/or trailer ball 116 could be made from metals, metal alloys, plastics, composites and/or wood, for example. These components could also be made from the same materials or different materials. Further, these components could be made from the same materials as the frame 102 or from different materials. In some embodiments, two or more of the mount 132, the post 114 and the trailer ball 116 could be integrated into a single component.

Although the mount 132, post 114, and trailer ball 116 are provided proximate the center of the frame 102 in the example shown, this might not be the case in other embodiments. Some embodiments could provide the mount 132 coupled towards one of the ends 150, 160 and/or one of the sides 170, 180 relative to the center of the frame 102. Embodiments could also or instead provide a horizontal projection, on the post 114 or on a component that couples the trailer ball 116 to the post, to support and position the trailer ball towards one of the ends 150, 160 and/or one of the sides 170, 180. The position of the trailer ball 116 could also be moveable relative to the frame 102. For example, the mount 132 could be a moveable mount that is moveable relative to the frame 102. The post 114 could also or instead provide movement of the trailer ball 116 relative to the frame 102. For example, the post 114 could include a telescopic horizontal member to control the position of the trailer ball 116 relative to the frame. The mount 132 could also or instead be movably mounted on the frame, on a movable platform supported by the frame 102 for example. Such a platform could be manually movable and/or powered.

Advantageously, aligning the trailer ball 116 towards one of the ends 150, 160 and/or one of the sides 170, 180 relative to the center of the frame 102 could allow for better distribution and balancing of the trailer weight that is supported by the power dolly 100, and potentially lead to better traction and/or stability of the power dolly. If the position of the trailer ball 116 is moveable, using a moveable mount or a telescopic horizontal member for example, then the distribution and balancing of the trailer weight could be adjusted, such as for different trailers and/or different arrangements of trailer loads.

In some embodiments, the position of a trailer ball could be controlled automatically with the use of one or more sensors, a control unit, and one or more powered components such as telescopic horizontal posts. The sensors could detect the distribution of the trailer weight on a power dolly and the control unit could compare this to a pre-defined or ideal weight distribution. An ideal weight distribution could be a weight balance proximate the center of the frame, but this might not be true in all cases. The sensors could determine an actual weight distribution by measuring an incline of the frame of the power dolly relative to horizontal or vertical, and/or by determining the weight that is supported by each wheel or tire on the power dolly. Measuring the air pressure in each tire is one method to determine the weight that is supported by each tire, but other methods could also or instead be used. Comparing the weight supported by each tire could indicate the overall weight distribution for the power dolly. The position of the trailer ball could be controlled, using the telescopic horizontal member in this example, to bring the sensed weight distribution closer to the pre-defined or ideal weight distribution. If the weight distribution is too close to one end or side, then the telescopic horizontal member could be controlled to move the trailer ball towards the other end or side. Determining the weight distribution on the power dolly and/or moving the position of the trailer ball to adjust or correct the weight distribution could be performed manually in some embodiments.

In some embodiments, a power dolly could include a lifting device such as a jack. Examples of jacks include scissor jacks and hydraulic jacks, which could be powered or manual. The lifting device could be coupled to the frame of the power dolly and to a coupling point, to raise or lower the coupling point relative to the frame. In other words, the lifting device could move the coupling point closer to, or away from, the frame. A lifting device could be integrated into a mount on a power dolly, such as the mount 132. Alternatively, the lifting device could be coupled to a mount, similar to how the post 114 is coupled to the mount 132 for example.

There could also be other means of coupling a power dolly to a moveable object. In some embodiments, a tether could be used to further couple the power dolly to the moveable object. The tether could be a rope or cable for example, to be connected between a power dolly frame or a bracket or other connector on the power dolly, and a trailer frame or a bracket or other connector on the trailer. When a tow hitch and a tether on a power dolly are connected to a trailer, the tether could provide additional stability compared to the tow hitch on its own. For example, the tether could maintain a predetermined distribution of trailer weight on the power dolly by preventing at least a portion of the power dolly from moving too far away from the trailer. The tether could also be relatively simply to connect. In some embodiments, the tether could be tied or hooked onto the trailer, and then appropriately tightened using a winch or other mechanism.

A flexible tether such as a rope or cable could be useful in helping prevent a power dolly from moving away from a trailer and out from underneath a coupling point. A rigid tether could also or instead be coupled between a power dolly and a trailer, to help prevent the power dolly moving out from underneath a coupling point in a direction toward or away from the trailer.

Multiple tethers, including flexible and/or rigid tethers, could be provided in some embodiments. For example, tethers could be coupled between a power dolly and different points on a trailer, to potentially improve stability of power dolly position relative to the trailer.

Tethers need not necessarily be coupled directly to a power dolly frame. One or more tethers could be coupled to a post or trailer ball, for example.

With reference again to FIGS. 1 to 6, the power dolly 100 includes multiple wheels 142, 152, 162, 172, 182, 192. Each of these wheels includes a rim on which a respective tire 144, 154, 164, 174, 184, 194 is mounted. The wheels 142, 152, 162, 172, 182, 192 are coupled to respective shafts 146, 156, 166, 176, 186, 196. The shafts 146, 166 are coupled to the member 104 via bearings 148, 168, and the shafts 176, 196 are coupled to the member 106 via bearings 178, 198. The shafts 156, 186 are coupled to bearings 158, 188. The bearing 158 is coupled to an offset plate 134, which is coupled to the member 104. Similarly, the bearing 188 is coupled to an offset plate 136, which is coupled to the member 106. The connections between the bearings 148, 158, 168, 178, 188, 198, the frame 102 and/or the offset plates 134, 136, could include releasable or non-releasable connections, for example.

The shafts 146, 156, 166, 176, 186, 196 function as axles for the wheels 142, 152, 162, 172, 182, 192. The shafts 146, 156, 166, 176, 186, 196 could be releasably connected to the rims on the wheels 142, 152, 162, 172, 182, 192, such that the wheels can be removed and replaced. The shafts 146, 156, 166, 176, 186, 196 could be non-releasably connected to the rims on the wheels 142, 152, 162, 172, 182, 192. The shafts 146, 156, 166, 176, 186, 196 are able to rotate about their axes via the bearings 148, 158, 168, 178, 188, 198, which constrain the shafts such that they cannot otherwise move relative to the frame. The bearings 148, 158, 168, 178, 188, 198 could be designed to reduce friction during rotation of the shafts 146, 156, 166, 176, 186, 196. For example, one or more of the bearings 148, 158, 168, 178, 188, 198 could include ball bearings or roller bearings. The shafts 146, 156, 166, 176, 186, 196 and bearings 148, 158, 168, 178, 188, 198 could be made out of metal, metal alloys or composites, for example.

The bearings 148, 158, 168, 178, 188, 198 are rigidly coupled to the frame 102, however this need not be the case in all embodiments. For example, power dolly could include a suspension system that allows for relative motion between a frame and wheels, shafts and/or bearings. The suspension system could include shocks or springs.

Bearing arrangements could be different than shown, in other embodiments. Bearings are on the axles in the example shown, but bearings could also or instead be provided between the rims and the axles.

The tires 144, 154, 164, 174, 184, 194 could include pneumatically inflated tires made primarily of rubber, with integrated fabric, belts, and/or wire in some embodiments. The thickness, width and tire pressure of these tires can vary based on, for example, the size and/or weight of the power dolly 100 itself and/or load characteristics such as the size and/or weight of trailers that the power dolly is designed to move. Solid tires or other types of tires that are not intended for inflation are also contemplated.

In other embodiments, the wheels 142, 152, 162 could instead be coupled to a continuous track such as a tank tread, and the wheels 172, 182, 192 could be coupled to a second continuous track. One or more of the wheels 142, 152, 162, 172, 182, 192 on each side of a power dolly could each include teeth to engage with grooves in the continuous tracks to drive the tracks. In other embodiments, the some or all of the wheels 142, 152, 162, 172, 182, 192 could be caster or idler wheels that do not include a tire. Although the size and type of wheels 142, 152, 162, 172, 182, 192 are the same in the power dolly 100, this might not be the case in all embodiments. For example, wheels and/or tires of different sizes could be used. Moreover, a combination of wheels with tires, wheels with tracks, and/or caster wheels could be used.

Although not shown, each of the wheels 142, 152, 162, 172, 182, 192 could include a brake to controllably slow or stop the power dolly 100. The brakes could be frictional brakes that include a brake pad coupled to the frame 102, and a rotor connected to the shaft of the wheel. The brakes could be driven electrically, or driven hydraulically by a hydraulic pump. The brakes could also be driven manually, for example by using cables connected from the brakes to a user input device such as a lever.

The power dolly 100 could be considered to include multiple wheel sets, which are coupled to the frame 102. As illustrated using dashed lines in FIG. 6, the wheel sets include a primary wheel set 600, a first support wheel set 602, and a second support wheel set 604. The primary wheel set 600 could also be referred to as a central or middle wheel set. The first and/or second support wheel sets 602, 604 could also be referred to as front, forward, back or rearward wheel sets. However, these terms may only apply to power dollies that have a defined front and back or a preferred direction of travel.

The primary wheel set 600 is coupled to the frame 102 between the end 150 and the end 160. The primary wheel set 600 includes the wheel 152 coupled toward the side 170 of the frame 102 relative to the mount 132 and the wheel 182 coupled toward the side 180 of the frame relative to the mount. More particularly, the mount 132 is positioned substantially between the wheels 152, 182 of the primary wheel set 600. The first support wheel set 602 is coupled to the frame 102 toward the end 150 of the frame relative to the primary wheel set 600. The first support wheel set 602 includes the wheel 142 coupled toward the side 170 of the frame 102 relative to the mount 132 and the wheel 172 coupled toward the side 180 of the frame relative to the mount. The second support wheel set 604 is coupled to the frame 102 toward the end 160 of the frame relative to the primary wheel set 600. The second support wheel set 604 includes the wheel 162 coupled toward the side 170 of the frame 102 relative to the mount 132 and the wheel 192 coupled toward the side 180 of the frame relative to the mount. In a sense, the first and second support wheel sets 602, 604 could be in front and behind the primary wheel set 600. The type of arrangement shown in FIG. 6 could also or instead be considered a wheel arrangement with the wheel sets 602, 604 on opposite sides of the primary wheel set 600 or toward opposite ends of the power dolly relative to the primary wheel set.

Coupling a wheel set to the frame 102 towards one of the ends 150, 160 could include coupling the wheel set to the frame at a position that is toward one of the ends 150, 160. Further, coupling a wheel set to the frame 102 towards one of the ends 150, 160 could include coupling the wheel set proximate to one of the ends 150, 160. Similarly, coupling a wheel toward one of the sides 170, 180 of the frame 102 could include coupling the wheel proximate to one of the sides 170, 180. As noted above, the term "toward" is not an exclusive term, and could only indicate one component of a vector. For example, the wheel 142 is coupled to the frame 102 toward the end 150 and toward the side 170 relative to the mount 132.

The grouping or arrangement of the wheels 142, 152, 162, 172, 182, 192 into wheel sets is done for ease of reference, and does not require or imply that the wheels of a set have any shared features or functions. In the example of the power dolly 100, the wheel sets are defined based, at least in part, on wheel positions relative to the ends 150, 160. However, wheel sets could instead be defined based on wheel positions relative to the sides 170, 180. In other embodiments, wheels sets could be defined based on how the wheels are coupled to a frame, based on the motors used to drive the wheels, based on the size of the wheels, based on the type of wheels, and/or based on other properties or parameters.

The power dolly 100 provides an illustrative example of six wheels and three wheel sets, but the number and arrangements of wheels and wheel sets could be different in other embodiments. In the power dolly 100, the wheels 142, 152, 162 are in-line, and the wheels 172, 182, 192 are in-line, but other arrangements are also possible. For example, the wheels 142, 162 could be further toward the side 170 or further laterally displaced from the frame 102 than the wheel 152, and the wheels 172, 192 could be further toward the side 180 or further laterally displaced from the frame 102 than the wheel 182. The opposite case, with the wheels 152, 182 further laterally displaced from the frame than the other wheels, is also contemplated.

In the power dolly 100, the axes of rotation for each wheel in a wheel set are substantially aligned. For example, in the primary wheel set 600, the shafts 156, 186 of the wheels 152, 182 are aligned. In some embodiments, wheel sets could have a shared an axle. For example, the shafts 156, 186 could be extended and connected. A differential could be used to allow the connected shafts to rotate independently.

The axes of rotation for each wheel in a wheel set need not always be aligned. Other embodiments could have wheel sets that include wheels with unaligned axes of rotation. For example, the wheel 152 could be closer to the end 150 than the wheel 182 in the primary wheel set 600. Similar comments also apply to the first and second support wheel sets 602, 604. In some embodiments, wheels from different wheel sets could have axes of rotation that are substantially aligned.

Although the primary wheel set 600, the first support wheel set 602 and the second support wheel set 604 of the power dolly 100 each include two wheels, this need not necessarily be the case in all embodiments. Wheel sets with one wheel or more than two wheels are also contemplated. In some embodiments, a power dolly could include a primary wheel set with two wheels, and two support wheel sets each with one wheel. In other embodiments, a power dolly could include a primary wheel set with one wheel, and two support wheel sets with two wheels. Embodiments with more than three wheel sets are also possible and expressly contemplated. A power dolly could also have more than one primary wheel set, and more or less than two support wheel sets.

As a result of the offset plates 134, 136, the primary wheel set 600 is mounted farther from the frame than the first support wheel set 602 and the second support wheel set 604. Therefore, the primary wheel set 600 extends farther from the frame 102 than the first support wheel set 602 and the second support wheel set 604. In particular, the primary wheel set 600 extends vertically lower than the first support when set 602 and the second support wheel set 604 relative to the frame 102. This is perhaps best shown in FIG. 4, which includes a dashed line 400 to illustrate the bottom or plane of the tire 184 extending below the bottom or plane of the tires 174, 194. Although not shown in FIG. 4, the tire 154 also extends below the bottom or plane of the tires 144, 164. Thus, the primary wheel set 600 could be considered to extend a greater vertical distance relative to frame 102 than the first and second support wheel sets 602, 604.

The lowered primary wheel set 600 is implemented using the offset plates 134, 136 in the embodiment shown. These offset plates are arranged between the members 104, 106 and the bearings 158, 188. The thickness of the offset plates 134, 136 determines the vertical distance to which the primary wheel set 600 is lowered compared to the first and second support wheel sets 602, 604. In some embodiments the thickness of the offset plates 134, 136 could be in the range from 0.1 inch to 6 inches. More particularly, the thickness of the offset plates 134, 136 could be within this range, illustratively 1 inch. However, any other thicknesses are also possible. In the power dolly 100, the offset plates 134, 136 are the same thickness. However, not all of the wheels of a primary wheel set necessarily need to be lowered to the same extent, or even lowered at all. Other embodiments could include offset plates with different thicknesses. Furthermore, some of the wheels of a primary wheel set might not be lowered relative to a support wheel set.

The offset plates 134, 136 are one means for extending the primary wheel set 600 farther from the frame 102 than the first support wheel set 602 and the second support wheel set 604. Other embodiments could create a similar effect in different ways. For example, the primary wheel set 600 could be coupled to a different part of the frame 102 than the first support wheel set 602 and the second support wheel set 604. In an embodiment, the primary wheel set 600 could be coupled to a bottom portion of the frame 102, while the first and second support wheel sets 602, 604 could be coupled to a top portion of the frame. Thus, the primary wheel set 600 would extend lower than the first and second support wheel sets 602, 604.

In some embodiments, the wheels of a primary wheel set could have a larger diameter than the wheels of a first support wheel set and a second support wheel set. Therefore, even if the axles of the wheels in the primary wheel set, the first support wheel set, and the second support wheel set are coupled to the frame at the same height, the wheels of the primary wheel set will extend farther from the frame and vertically lower than the wheels of the first and second support wheel sets.

Due to the lowered primary wheel set 600, there could be situations where only the primary wheel set, or the primary wheel set and only one wheel set of the first and second support wheel sets 602, 604 will be contacting the ground. In these situations, either the power dolly 100 will be supported by only the primary wheel set 600, by the primary wheel set and the first support wheel set 602, or by the primary wheel set and the second support wheel set 604. Advantageously, this could allow the power dolly 100 to turn or pivot more easily. For example, only one or two wheel sets contacting the ground could potentially produce less drag during differential steering than when all three wheel sets are contacting the ground.

This reduction in drag could be due, at least in part, to there being fewer wheels contacting the ground. However, there could be other factors as well. When the first support wheel set 602 or the second support wheel set 604 is off of the ground, the effective length of the power dolly that is contacting the ground could be considered to be shortened compared to when all of the wheel sets are contacting the ground. This shortened effective length could reduce the circumferential distance covered by the wheels during a pivot, and therefore reduce the drag produced by the wheels.

Even with one of the first and second wheel sets 602, 604 being off of the ground at a given time, both support wheel sets can still provide support and stability for the power dolly 100. The power dolly 100 could be tilted to transition between the first support wheel set 602 contacting the ground and the second support wheel set 604 contacting the ground. For example, if the power dolly 100 is moving in the direction of the end 150 and pulling a trailer that is in the direction of the end 160, the power dolly could be tilted such that the second support wheel set 604 is contacting the ground and supporting some the trailer weight. If instead the power dolly is moving in the direction of the end 160 and pushing a trailer that is in the direction of the end 160, the power dolly could be tilted such that the first support wheel set 602 is contacting the ground and supporting some the trailer weight. Other situations are also possible. In any case, the first and second support wheel sets 602, 604 could provide support and stability to the power dolly 100, and help prevent the power dolly from moving undesirably relative to a trailer. This could improve user safety for the power dolly.

For both the first and second support wheel sets 602, 604 to contact the ground, a substantial weight might need to be placed on the power dolly 100, which could deform the tires 154, 184 enough to at least partially counteract the effect of the lower position of the wheels 152, 182. If the power dolly 100 is used on ground that is soft or deformable, the primary wheel set 600 could sink into the ground enough to at least partially counteract the effect of the lower position of the wheels 152, 182. In any case, when all three wheel sets are contacting the ground the primary wheel set 600 could support more of the weight transferred through the power dolly 100, and the first and second support wheel sets 602, 604 will support less weight as a result. Advantageously, this additional weight supported by the primary wheel set could allow the power dolly 100 to pivot or turn more easily, using differential steering for example. During a turn or a pivot, one or more of the tires 144, 164, 174, 194 skid or drag across the ground. If the first and second support wheel sets 602, 604 are supporting less weight, then the resistance created by the tires 144, 164, 174, 194 sliding across the ground could be reduced. As a result, less power might be required to turn or pivot the power dolly 100.

It could be desirable for the vertical position of the primary wheel set 600 relative to the frame 102 to be controllable. As such, in some embodiments, the power dolly 100 could include an adjustable-height coupling to couple the primary wheel set 600 to the frame 102. The adjustable-height coupling could be controllable to raise or lower the vertical position of the primary wheel set 600. For instance, it could be desirable to raise or lower the position of the primary wheel set 600 based on the amount of weight that is supported by the power dolly 100.

In the case of heavier trailers, the primary wheel set 600 could be lowered relative to the frame 102, to move the primary wheel set away from the frame and allow for improved turning and pivoting by reducing the load carried by the support wheel sets 602, 604 and thereby reducing resistance between the support wheels and the ground. For movement of heavy loads other than when the power dolly is to be turned or pivoted, it could be advantageous to raise the primary wheel set 600, to move the primary wheel set toward the frame 102 and distribute loading between the primary wheel set and the support wheel sets 602, 604. Raising the primary wheel set 600 for heavier trailers could also compensate for deformation of the tires 154, 184, or the sinking of the tires into the ground. In the case of lighter trailers, the primary wheel set 600 could be raised or lowered to a lesser extent relative to the frame 102, with support wheel drag during turning or pivoting and/or weight distribution between the wheel sets 600, 602, 604 potentially being of less concern for lighter loads.

An adjustable-height coupling could be provided for each wheel 152, 182 of the primary wheel set 600, or both wheels 152, 182 could be raised or lowered using a single adjustable-height coupling. In other embodiments, the vertical position the first and secondary wheel sets 602, 604 could also or instead be controllable relative to the frame 102.

The adjustable-height coupling could include a manually adjustable coupling, which could be implemented in any of a variety of different ways. In some embodiments, the bearings 158, 188, the offset plates 134, 136 and the members 104, 106 could be connected to each other using releasable connections such bolts. In these embodiments, the offset plates 134, 136 could be removed and exchanged for offset plates of different thicknesses to raise or lower the primary wheel set 600. Additional offset plates could also or instead be added or removed. Other types of spacers, such as blocks and wedges, could also be used to raise or lower the primary wheel set 600.

In some embodiments, the members 104, 106 could include tubes or plates with multiple bores or holes in the vertical direction. These bores or holes could receive or otherwise releasably couple to the bearings 158, 188. Thus, the bearings 158, 188 could be moved to different vertical positions relative to the frame 102 by coupling the bearings to different bores or holes. The wheels 152, 182 will also be moved to different vertical positions as a result. The bearings 158, 188 could also or instead be rigidly connected to tubes or plates with multiple bores or holes in the vertical direction, which couple to the members 104, 106 using releasable connections such as bolts.

In some embodiments, the bearings 158, 188 could be coupled to the members 104, 106 using shafts or tubes that are telescopic in the vertical direction. For instance, a bolt or other threaded structure could be provided in the connection between the bearings 158, 188 and the members 104, 106. Turning the threaded structure in one direction could lower one or more of the wheels 152, 182, and turning the threaded structure in the other direction could raise one or more of the wheels. Examples of other telescopic components are discussed elsewhere herein.

Cams are another possible means to control the vertical position of the primary wheel set 600. For example, the bearings 158, 188 could be rigidly coupled to one or more cams. Each cam could be connected to a shaft or tube that is coupled somewhere on the frame 102. When the shaft or tube is rotated, the cam produces a vertical component to the motion that raises or lowers one of the wheels 152, 182. The shaft or tube could be manually rotated using a wrench, for example. The position of the cam could be locked in place using pins, bolts, clamps and/or a ratchet system.

Manually adjustable couplings could also include shocks or springs, which could bias the wheels 152, 182 towards or away from the frame 102. Shocks or springs that bias the wheels 152, 182 away from the frame 102 could also provide a form of suspension for the wheels. Spacers such as blocks or wedges, telescopic members, cams, jacks, or other means could be installed or removed to lengthen or shorten shocks or to extend or compress springs, and in effect lower the vertical position of the wheels 152, 182.

The adjustable-height coupling could also or instead include a powered adjustable coupling. For example, at least some of the manual adjustable couplings described herein could also or instead be implemented with powered components. Powered components could allow wheels to be raised and lowered before or after the power dolly 100 is coupled to a trailer, and even when the power dolly is in motion. This functionality could be more convenient than a manual adjustable coupling, and make the power dolly 100 more easily adaptable for different terrains and/or trailers, for example.

In some embodiments, a telescopic shaft or tube could be hydraulically or pneumatically powered to raise or lower the primary wheel set 600. In other embodiments, bolts or other threaded structures provided in the connection between the bearings 158, 188 and the members 104, 106 could be turned using an electric motor to raise or lower the primary wheel set 600. In the case that the bearings 158, 188 are connected to the members 104, 106 using springs or shocks, a spacer could be pushed or pulled between the bearings 158, 188 and the members 104, 106 to expand or contract the springs or shocks and raise or lower the primary wheel set 600. The spacer could be pushed or pulled using a hydraulic or pneumatic piston, or an electric motor coupled to a screw. In further embodiments, cams coupled to the bearings 158, 188 and the frame 102 could be rotated using an electric motor to raise or lower the primary wheel set 600.

A powered adjustable coupling could be controlled using a control unit. This control unit could be coupled to a battery and transfer power from the battery to the powered adjustable coupler. The control unit could include, or be otherwise coupled to, a user input device to receive user input to raise or lower the primary wheel set 600 relative to the frame 102. The control unit could also or instead be coupled to one or more sensors on the power dolly 100 that measure characteristics of the power dolly to determine if the primary wheel set 600 should be raised or lowered. For example, if a motor of the power dolly 100 is drawing more power than normal during turning or pivoting, the primary wheel set 600 could be lowered to reduce the drag caused by the first and second support wheel sets 602, 604.

Position adjustment or control need not necessarily be provided for the primary wheel set 600, or not only for the primary wheel set. Raising or lowering one or both of the support wheel sets 602, 604 could adjust or control an amount by which, if at all, the primary wheel set 600 is lower than or out of alignment with the support wheel sets.

Any or all of the wheel sets 600, 602, 604 could be powered to provide drive or propulsion to the power dolly 100. The drive provided by the powered wheel sets could enable movement of the power dolly 100, and a moveable object coupled to the power dolly. Drive or propulsion could be created using one or more motors coupled to the shafts of the powered wheels. These motors could also or instead provide slowing and braking functionality for the powered wheels. Some of these motors could be electric motors, in which case the power dolly could also include or be coupled to a source of electricity, such as a battery. Some of these motors could also or instead be hydraulic and/or pneumatic, in which case the power dolly 100 could also include or be coupled to hydraulic and/or pneumatic pumps. Some of these motors could also or instead be internal combustion engines, such as gasoline engines, in which case the power dolly 100 would need to include or be coupled to a source of combustion fuel. Each powered wheel could have a dedicated motor. These motors could be integrated into the wheel itself, such as in the form of a wheel hub motor. Alternatively, the motors could be separate from the wheels and mounted elsewhere on the power dolly 100.

A transmission or drivetrain, coupled to the frame 102, could transfer or deliver power to at least one of the wheels 142, 152, 162, 172, 182, 192. For example, the transmission could include a gearbox, a differential and/or drive shafts to controllably deliver power from a motor to one or more wheels. The transmission could provide several gear ratios, power or torque characteristics, and speeds for the power dolly 100. Directional control, for forward and reverse movement and possibly differential steering, could also be provided by the transmission.

A chain drive could also or instead transfer or deliver power to at least one of the wheels 142, 152, 162, 172, 182, 192. This chain drive could include idlers and tension adjusters that are coupled to the frame 102 using releasable or non-releasable connections. The chain drive could connect to sprocket(s) on one or more motors, and to sprocket(s) on one or more of the shafts 146, 156, 166, 176, 186, 196. The relative sizes of sprockets on motors and shafts could be chosen to achieve a predefined gear ratio. The motors and/or shafts could further include several sprockets of different sizes, which the chain could be switched between to generate different gear ratios for producing different power or torque characteristics and speeds.

In some embodiments, the primary wheel set 600 is a powered primary wheel set to provide drive to the power dolly 100. The wheels 152, 182 of the primary wheel set could be powered using one or more motors. In addition, at least one of the first support wheel set 602 and the second support wheel set 604 could be powered to provide additional drive to the power dolly 100. For example, any or all of the wheels 142, 162, 172, 192 could be powered using the same one or more motors as for the primary wheel set 600, or using different motors. Thus, there could be one or multiple powered wheel sets.

The power dolly 100 further includes wheel covers 138, 140. The wheel cover 138 partially covers the wheels 142, 152, 162, and the wheel cover 140 partially covers the wheels 172, 182, 192. The wheel covers could be made from metals, metal alloys, plastics, or composites, for example. The wheel covers 138, 140 could help prevent a user or other person from touching one or more moving parts of the power dolly 100, such as the wheels and shafts, and thus provide a degree of safety for the power dolly. Further, the covers 138, 140 could protect users from rocks, dust and other debris that could be thrown by the wheels during use. The covers 138, 140 could also or instead serve to protect the wheels and/or tires of the power dolly 100 in the event of a collision with an object.

Figure 7:
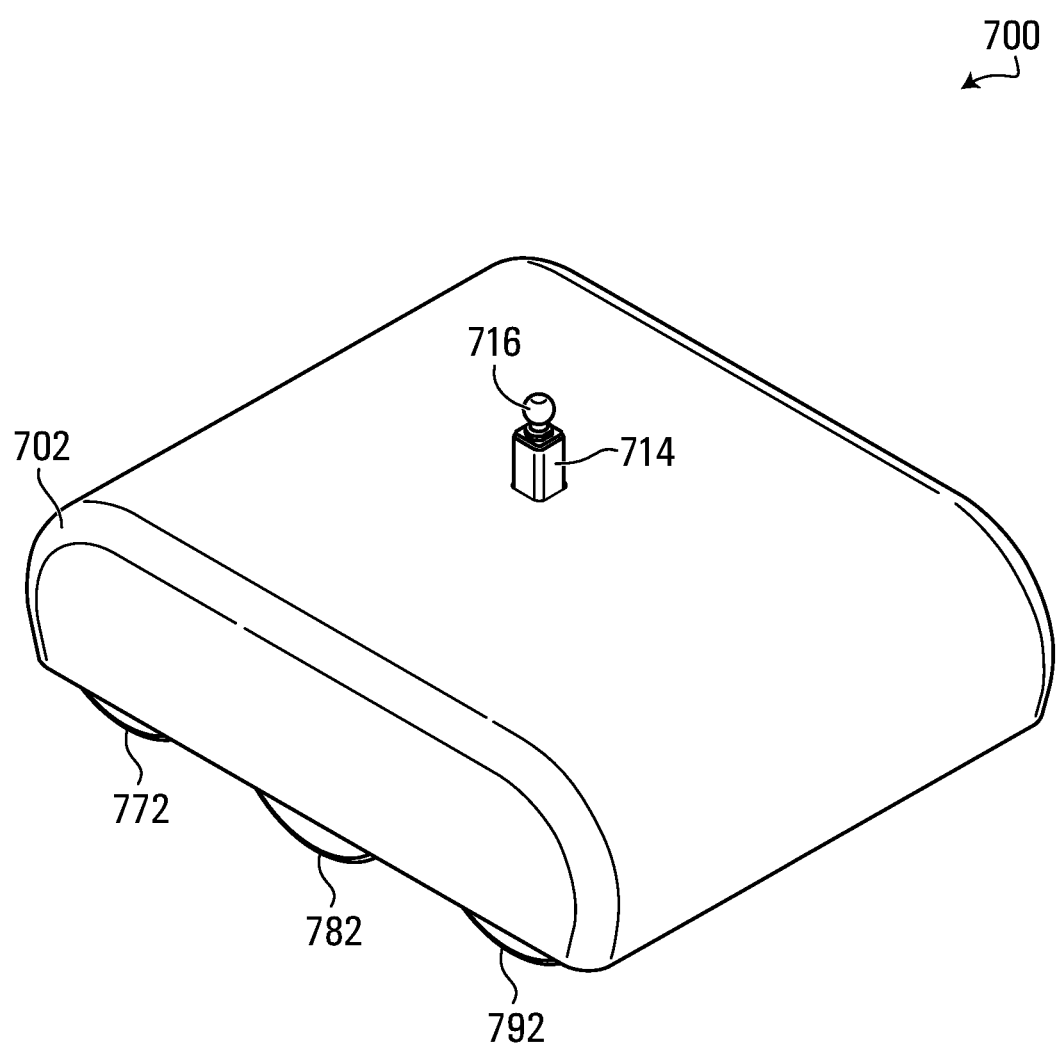
FIG. 7 is an isometric view of another example power dolly.

The wheel covers 138, 140 do not cover the entire width of the power dolly 100. As such, many components of the power dolly 100 are exposed. However, covers that extend over the width of a power dolly are also contemplated. FIG. 7 is an isometric view of another example power dolly 700. The power dolly 700 includes wheels 772, 782, 792, a post 714 and a trailer ball 716. These components could be similar to the wheels 172, 182, 192, the post 114 and the trailer ball 116 that are discussed in detail above with reference to FIGS. 1 to 6. The power dolly 700 includes a single cover 702 that covers the wheels and frame of the power dolly. The cover 702 could also cover other components of the power dolly 700, including a controller, batteries, motors, a transmission and/or a chain drive. A portion of the post 714, as well as the trailer ball 716, protrude through the cover 702 to allow for coupling to a moveable object.

FIG. 7 is intended solely for the purposes of illustration. The size and/or shape of a power dolly cover or housing or parts thereof could vary depending on such factors as desired overall dimensions, intended applications, and/or internal space to accommodate components, for example.

Figure 8:
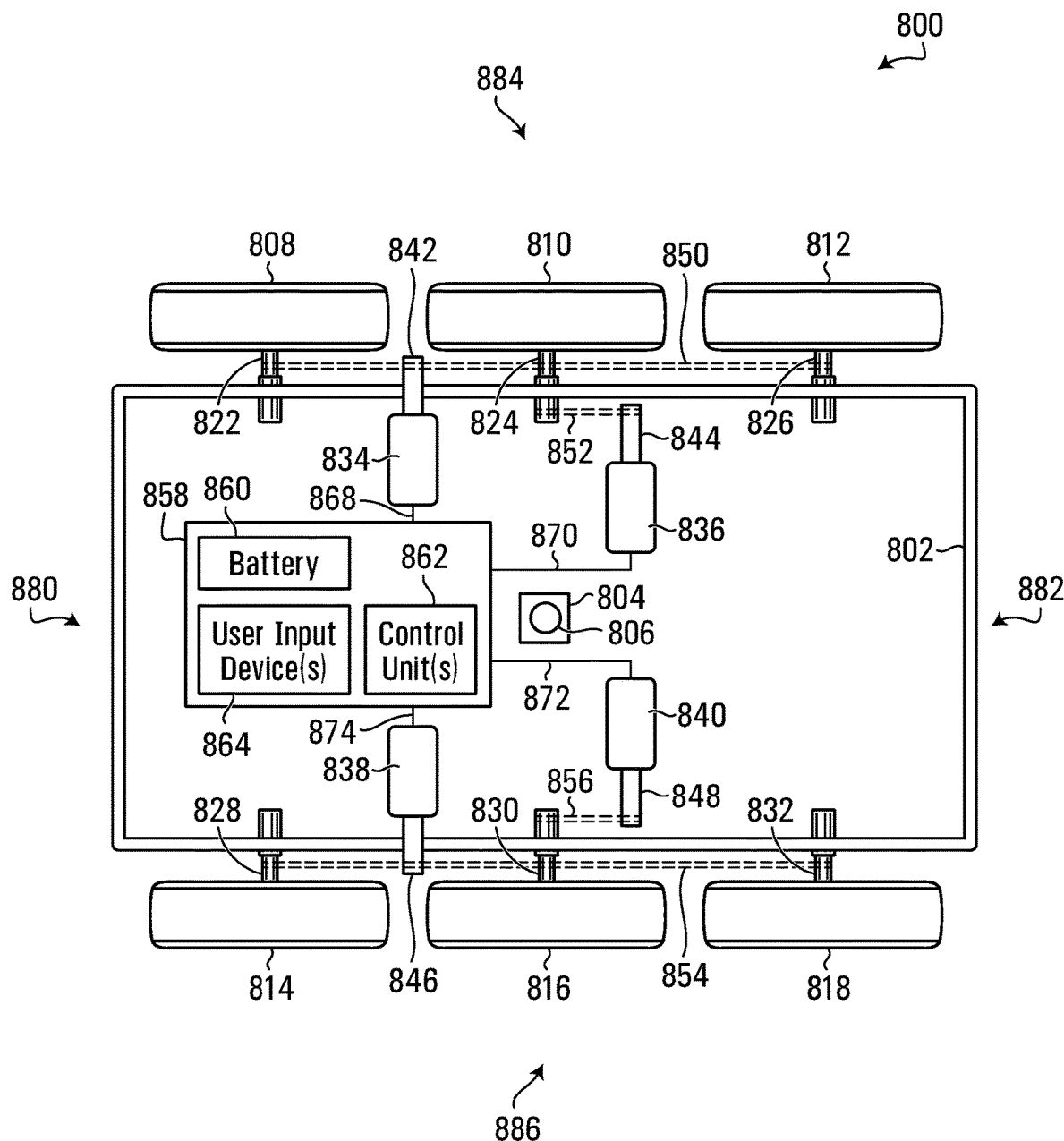
FIG. 8 is a block diagram of an example power dolly.

Referring now to FIG. 8, a block diagram of an example power dolly 800 is shown. In general, components that are illustrated in FIG. 8 could be similar to corresponding components discussed in detail above with reference to FIGS. 1 to 6. As such, any of the remarks, embodiments, implementations, or options provided in the discussion of the power dolly 100 could also apply to the power dolly 800.

The power dolly 800 includes a frame 802, which is coupled to and supports a mount 804, multiple shafts 822, 824, 826, 828, 830, 832, multiple motors 834, 836, 838, 840, and a power dolly controller 858. The frame 802 includes two ends 880, 882 and two sides 884, 886. The frame 802 could include multiple members to support and couple to various components. The frame 802 could also or instead include a substantially planar base that supports and/or couples to various components.

The mount 804 is provided to couple the power dolly 800 to a moveable object. A tow hitch 806 is coupled to the mount 804, which could be used to couple the power dolly 800 to a trailer coupler. The tow hitch 806 could include, or couple to, a trailer ball or other coupling point, for example.

The shafts 822, 824, 826, 828, 830, 832 couple to respective wheels 808, 810, 812, 814, 816, 818. Each of these shafts could be coupled to a bearing (not shown), which constrains the motion of the shafts and reduces friction during rotation. One or more of the wheels 808, 810, 812, 814, 816, 818 could include tires or tracks to provide traction. One or more of the wheels 808, 810, 812, 814, 816, 818 could instead be caster wheels.

The power dolly 800 includes a multiple powered wheel sets, which are coupled to the frame 802, to provide drive to the power dolly. The powered wheel sets include a primary wheel set coupled to the frame 802 between the end 880 and the end 882, a first support wheel set coupled to the frame toward the end 880 of the frame relative to the primary wheel set, and a second support wheel set coupled to the frame toward the end 882 of the frame relative to the primary wheel set.

The primary wheel set includes the wheel 810 coupled toward the side 884 of the frame 802 relative to the mount 804, and the wheel 816 coupled to the frame toward the side 886 relative to the mount. The power dolly 100 includes the motor 836 to provide power to the wheel 810, and the motor 840 to provide power to the wheel 816. Specifically, the motor 836 includes a shaft or stub 844 with a sprocket to receive a chain 852. The shaft 824, which is coupled to the wheel 810, also includes a sprocket to receive the chain 852. Thus, the chain 852 could transfer power from the motor 836 to the wheel 810. The size of the sprockets on the shaft 844 and the shaft 824 could be chosen to achieve an appropriate gear ratio for the motor 836 and the wheel 810. This gear ratio could be chosen based on the torque output of the motor 836, for example. More than one sprocket could be provided on the shaft 844 and/or the shaft 824, to provide additional gear ratios. The chain 852 could be supported by chain tensioners and/or idlers that are coupled to the frame 802. Similarly, the motor 840 includes a shaft 848 with a sprocket to receive a chain 856. The chain 856 is received by another sprocket on the shaft 830 that is coupled to the wheel 816. The motor 840, shaft 848, and chain 856 could be same as or different from the motor 836, the shaft 844 and the chain 852.

The first support wheel set includes the wheel 808 coupled toward the side 884 of the frame 802 relative to the mount 804, and the wheel 814 coupled to the frame toward the side 886 relative to the mount. The power dolly 100 includes the motor 834 to provide power to the wheel 808, and the motor 838 to provide power to the wheel 814. The second support wheel set includes the wheels 812, 818, the wheel 812 being coupled toward the side 884 of the frame 802 relative to the mount 804 and being powered by the motor 834, and the wheel 818 being coupled toward the side 886 of the frame relative to the mount and being powered by the motor 838. The motor 834 includes a shaft 842 with a sprocket to receive a chain 850. The shafts 822, 826, which are coupled to the wheels 808, 812, have sprockets to receive the chain 850. As such, the motor 834 can provide drive to the wheels 808, 812. Similar comments apply to the motor 838, which includes a shaft 846 with a sprocket to receive a chain 854. The chain 854 is received by sprockets on the shafts 828, 832.

The chains 850, 852, 854, 856 could be made out of metal or metal alloys, such as steel or aluminum, for example. In some embodiments, the chains 850, 852, 854, 856 could be roller chains. However, the chains 850, 852, 854, 856 could also or instead be detachable chains or pintle chains, for example.

The shafts 824, 830 do not include sprockets to receive the chains 850, 854. Rather, the power dolly 800 could include idlers that ensure the chains 850, 854 do not contact the shafts 824, 830. Therefore, the wheel 810 is driven mechanically independent of the wheels 808, 812, and the wheel 816 is driven mechanically independent of the wheels 814, 818. However, in other embodiments, the wheels 808, 812, 816 could be driven together using a single motor. For example, a power dolly could exclude the motor 836 and chain 852, and drive all three wheels 808, 810, 812 using the motor 834 and the chain 850. The motor 834 might be a higher power in a single-motor implementation. Similarly, the wheels 814, 816, 818 could instead be driven together using the motor 838 and the chain 854.

The power dolly controller 858 includes a battery 860, one or more control units 862, and one or more user input devices 864. Components 862 and 864 are referenced primarily in plural form herein, but such plural references are intended to encompass one or more of each of these components. Although the battery 860, control units 862, and user input devices 864 are shown grouped together in the power dolly 800, these components could instead be provided at different locations on the power dolly, or even separately from the power dolly.

The battery 860 could power the power dolly controller 858, the motors 834, 836, 838, 840, and/or other components of the power dolly 800. The battery 860 could actually be a bank of several batteries, which could be connected together to provide larger voltages, larger currents, and/or a longer battery life.

The control units 862 could include any of a variety of control units with distinct functions, and/or a single control unit. The control units 862 could be implemented, for example, using hardware, firmware, one or more components that execute software stored in one or more non-transitory memory devices (not shown), such as a solid-data memory device or a memory device that uses movable and/or even removable storage media. Microprocessors, Application Specific Integrated Circuits (ASICs), Field Programmable Gate Arrays (FPGAs), and Programmable Logic Devices (PLDs) are examples of processing devices that could be used to execute software.

The power dolly controller 858 is coupled to the motors 834, 836, 838, 840 via respective connections 868, 870, 872, 874, which could include electrical cables or wires. The motors 834, 836, 838, 840 are electric motors, however this might not be the case in all embodiments. The control units 862 control the voltage/current/power delivered to the motors 834, 836, 838, 840 based on a desired speed and/or torque for each motor. Torque and speed, in electric motors for example, could be related, such that an increase in speed results in a decrease in torque, and vice versa. The control units 862 are capable of controlling each of the motors 834, 836, 838, 840 independently. As such, different voltage/current/power could be delivered to each of the motors, which could allow for turning and pivoting of the power dolly 800. The control units could be calibrated for each motor 834, 836, 838, 840, to compensate for variations between these motors. The control units 862 could also control the motors 834, 836, 838, 840 to allow for slowing and/or braking of the power dolly 800. The control units 862 could also or instead control brakes (not shown) on the power dolly 800 for slowing and/or braking.

The control units 862 could include or be coupled to any number of various sensors on the power dolly 800. Examples of sensors that could be implemented include tire pressure sensors to determine the weight carried by each tire, tilt sensors to determine the incline of the power dolly, voltage/current/power sensors to determine if various powered components are operating at a safe level, as well as others.

The control units 862 could include a trailer brake controller. The trailer brake controller could include a cable (not shown) that is connected to a corresponding cable on a trailer. The trailer brake controller could engage and controller the trailer's electrical brakes. The trailer's brakes could be engaged when the power dolly is stopped or slowing down, for example.

The control units 862 could control several other aspects of a power dolly. For example, if a powered telescopic beam or shaft is implemented on the frame 802, the control units 862 could be used to control this powered telescopic beam or shaft. Similarly, if the mount 804 includes or is coupled to a powered jack, the control units 862 could controllably raise or lower the powered jack. The control units 862 could also or instead control such components as one or more powered adjustable couplings for adjustable-height couplings, and/or wheel raising/lowering.

The user input devices 864 allow a user to control various aspects of the power dolly 800, including moving and steering the power dolly. The user input device 864 could allow a user to control the direction and speed of the power dolly by controlling the power delivered to the motors 834, 836, 838, 840. The user input devices 864 could also or instead control the brakes on the power dolly 800. The computation involved in moving and steering the power dolly 800 could be handled, at least in part, by the control units 862. For example, a user input device to steer the power dolly 800 could include a joy stick, and the control units 862 could determine the appropriate power to deliver to each motor to achieve the movement indicated on the joy stick. As such, simplified user input devices could be used to control the power dolly.

The user input devices 864 could be implemented in any of several ways. In some embodiments, various buttons, switches or knobs could be mounted or attached to the power dolly 800. Buttons, switches or knobs could also or instead be mounted on a shaft or rod that extends from the power dolly 800 to an appropriate height for a user to operate while standing. However, for reasons including the safety and/or convenience of the user, at least some of the user input devices 864 could instead be provided on a remote control. The remote control could be connected to the power dolly controller 858 using cables and/or using wireless connections such as radio and/or infrared.

Embodiments described above relate primarily to power dollies. Other embodiments, including methods, are also contemplated.

Figure 9:
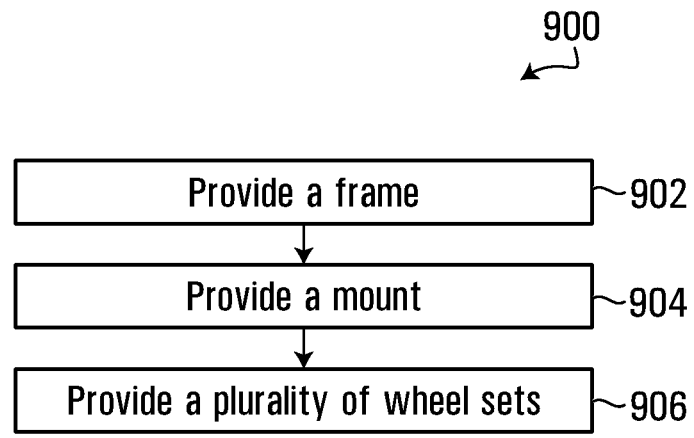
FIG. 9 is a flow diagram illustrating a method according to an embodiment.

FIG. 9, for example, is a flow diagram illustrating a method 900 according to an embodiment. The method 900 includes an operation 902 of providing a frame for a power dolly, an operation 904 of providing a mount to couple the power dolly to a moveable object, and an operation 906 of providing a plurality of wheel sets. These operations 902, 904, 906 are shown separately for illustrative purposes, but need not be separate operations in all embodiments. For example, a power dolly could be sold including a frame, a mount and a plurality of wheel sets in an assembled state.

Alternatively, one or more of the frame, mount and plurality of wheels sets could be provided separately and assembled by a user.

The frame, mount and plurality of wheels sets could be provided at 902, 904, 906 by actually manufacturing these components. Any of these components, and/or other components, could instead be provided by purchasing or otherwise acquiring the components from one or more suppliers. At least some components or parts thereof could be provided in different ways.

A frame that is provided at 902 could include a first end, a second end, a first side and a second side. The frame could be similar to the frames discussed above with reference to FIGS. 1 to 8. The frame could be provided by welding, riveting, bolting or otherwise attaching multiple members or shafts together, for example.

A mount that is provided at 904 could be similar to the mounts discussed above with reference to FIGS. 1 to 8. The mount could be coupled to the frame using releasable or non-releasable engagements. In some embodiments, the mount could receive or otherwise couple to a tow hitch or post. Tow hitches and coupling points could be provided with the mount, or they could be provided separately.

The plurality of wheel sets provided at 906 could include a primary wheel set coupled to the frame between the first end and the second end, a first support wheel set coupled to the frame toward the first end of the frame relative to the primary wheel set, and a second support wheel set coupled to the frame toward the second end of the frame relative to the primary wheel set. This plurality of wheel sets could be similar to the wheel sets discussed above with reference to FIGS. 1 to 8. However, other numbers and configurations of wheel sets are possible. The plurality of wheel sets could be coupled to the frame during assembly of the power dolly, or alternatively the plurality of wheel sets could be provided separately from the frame.

In some embodiments, the plurality of wheel sets provided at 906 could include a plurality of powered wheel sets to provide drive to the power dolly. For example, the power dolly could include a powered primary wheel set to provide drive to the power dolly, and one or more powered support wheel sets to provide additional drive to the power dolly.

In some embodiments, providing the plurality of wheels sets could include providing the primary wheel set such that it extends farther from the frame than the first support wheel set and the second support wheel set.

The method 900 is an illustrative example. Other operations could be included, such as providing a power dolly controller, providing one or more motors, providing a transmission, providing a chain drive, providing shafts or bearings for the wheels, providing a tow hitch, providing a jack, providing a coupling point, providing batteries and/or providing a battery charger, and/or assembling or otherwise connecting any of various components.

Figure 10:
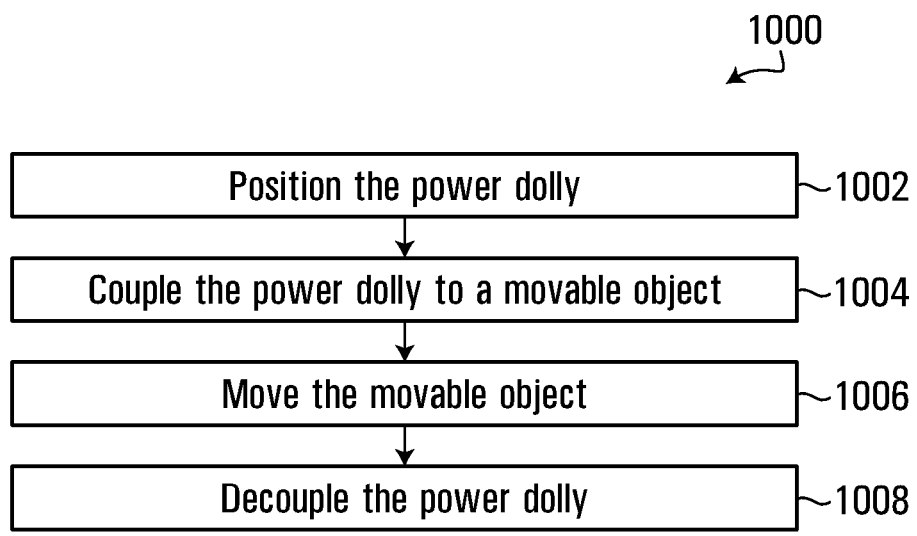
FIG. 10 is a flow diagram illustrating a method according to another embodiment.

User methods for power dollies are also contemplated. FIG. 10 is a flow diagram illustrating a method 1000 according to another embodiment.

The method 1000 includes an operation 1002 of positioning a power dolly. This could include operating one or more user input devices, mounted on the power dolly itself or a remote control, to control the motors of the power dolly. This operation could include positioning the power dolly such that it is aligned with a point on a trailer to be moved. For example, in the case that a trailer ball is coupled to the power dolly, the power dolly could be moved such that the trailer ball is positioned underneath a trailer ball coupler. In another example, if a frame coupler is coupled to the power dolly, the power dolly could be moved such that the frame coupler is positioned underneath a portion of the frame of the trailer. If a jack is provided between the frame and the coupling point of a power dolly, the operation 1002 could further include lowering the jack such that the coupling point will fit underneath of the trailer.

The method 1000 also includes an operation 1004 of coupling the power dolly to a moveable object. This operation could include operating a jack on the trailer to lower the trailer onto the coupling point of the power dolly. If a jack is provided on the power dolly, the operation 1004 could also or instead include raising the jack on the power dolly. Other steps could be involved to properly couple the coupling point of the power dolly to a trailer. For example, in the case that the coupling point is a trailer ball, a latch on the trailer ball coupler may need to be closed to fully lock and couple to the trailer ball. In another example, in the case that the coupling point is a frame coupler, straps on the frame coupler could be tightened around a portion of the frame. The operation 1004 could further include attaching a tether from the power dolly to the moveable object. The operation 1004 could also include modifying the trailer for coupling to the power dolly, for example by adding stabilization bars between the trailer coupler and the frame of the trailer.

The method 1000 further includes an operation 1006 of moving the movable object, by moving the power dolly. The operation 1006 could include moving the power dolly using one or more user input devices. The power dolly could push or pull the moveable object to a desired location. In one example, if a frame coupler is supporting the trailer by its frame, the trailer could be moved such that the trailer coupler is positioned over a hitch on a motorized vehicle.

The method 1000 includes an operation 1008 of decoupling the power dolly from the moveable object. The operation 1008 could include lowering a jack on the trailer to remove the weight of the trailer from the power dolly. A jack coupled to the power dolly could also or instead be lowered. The operation 1008 could further include releasing latches and/or straps that are coupling the coupling point of the power dolly to a trailer. In the case that the power dolly includes a frame coupler and a jack coupled to the frame coupler, the operation 1008 could include lowering the trailer coupler on the trailer using the jack to engage the trailer coupler with a hitch on a motorized vehicle. The use of a frame coupler and a jack on a power dolly could assist with aligning and coupling a trailer to a motorized vehicle without needing to move the vehicle. The reverse is also possible, where a frame coupler and a jack could be used to decouple a trailer from a motorized vehicle, and the power dolly can then be used to move the trailer without using the vehicle.

The method 1000 is an illustrative example of a user method. Other user methods are also contemplated. In some embodiments, an operation of removing, adding and/or replacing a tow hitch or coupling point on a power dolly could be performed. An operation of adjusting or controlling one or more extendable or telescope components could also or instead be performed.

It should be appreciated that the drawings and description herein are intended solely for illustrative purposes, and that the present invention is in no way limited to the particular example embodiments explicitly shown in the drawings and described herein.

What has been described is merely illustrative of the application of principles of embodiments of the present disclosure. Other arrangements and methods can be implemented by those skilled in the art. A power dolly could include additional, fewer, and/or different components arranged in a similar manner to that shown in any of FIGS. 1 to 8, or in a different manner than shown. Similarly, methods could include additional, fewer, and/or different operations performed in a similar order to that shown in FIG. 9 or FIG. 10, or in a different order.

While the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and potential advantages have been described in detail, various changes, substitutions and alterations can be made herein without departing from the invention as defined by the appended claims. Moreover, the scope of the present application is not intended to be limited to the particular embodiments of any process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A power dolly comprising:
    a frame comprising a first end, a second end, a first side and a second side, a lengthwise direction of the dolly being defined between the first end and the second end;
    a mount coupled to the frame;
    a tow hitch coupled to the mount; and
    a plurality of powered wheel sets, coupled to the frame, to provide drive to the power dolly, the plurality of powered wheel sets comprising:
        a primary wheel set coupled to the frame between the first end and the second end, the primary wheel set comprising a first wheel coupled toward the first side of the frame relative to the mount and a second wheel coupled toward the second side of the frame relative to the mount, wherein the mount is coupled to the frame to position the tow hitch lengthwise substantially between the first wheel and the second wheel;
        a first support wheel set coupled to the frame toward the first end of the frame relative to the primary wheel set; and
        a second support wheel set coupled to the frame toward the second end of the frame relative to the primary wheel set.

2. The power dolly of claim 1, wherein the primary wheel set extends farther from the frame than the first support wheel set and the second support wheel set.

3. The power dolly of claim 1, further comprising:
    a first motor to provide power to the first wheel; and
    a second motor to provide power to the second wheel.

4. The power dolly of claim 3, wherein the first support wheel set comprises a third wheel coupled toward the first side of the frame relative to the mount and a fourth wheel coupled toward the second side of the frame relative to the mount.

5. The power dolly of claim 4, further comprising:
    a third motor to provide power to the third wheel; and
    a fourth motor to provide power to the fourth wheel.

6. The power dolly of claim 5, wherein the second support wheel set comprises a fifth wheel and a sixth wheel, the fifth wheel being coupled toward the first side of the frame relative to the mount and being powered by the third motor, the sixth wheel being coupled toward the second side of the frame relative to the mount and being powered by the fourth motor.

7. The power dolly of claim 1, wherein the plurality of powered wheel sets comprises tires.

8. The power dolly of claim 1, wherein the tow hitch comprises a distal end to couple the power dolly to a trailer, and the tow hitch extends from the mount at least partially towards the first end or the second end of the frame to position the distal end of the tow hitch towards the first end or the second end relative to the primary wheel set.

9. The power dolly of claim 8, wherein the tow hitch comprises a telescopic member to control the position of the distal end of the tow hitch relative to the first end and the second end of the frame.

10. The power dolly of claim 1, further comprising:
    a first track and a second track coupled to the plurality of powered wheel sets.

11. A power dolly comprising:
    a frame comprising a first end, a second end, a first side and a second side, a lengthwise direction of the dolly being defined between the first end and the second end;
    a mount coupled to the frame;
    a tow hitch coupled to the mount; and
    a plurality of wheel sets coupled to the frame, the plurality of wheel sets comprising:
        a powered primary wheel set, coupled to the frame between the first end and the second end, to provide drive to the power dolly, the primary wheel set comprising a first wheel coupled toward the first side of the frame relative to the mount and a second wheel coupled toward the second side of the frame relative to the mount, wherein the mount is coupled to the frame to position the tow hitch lengthwise substantially between the first wheel and the second wheel;
        a first support wheel set coupled to the frame toward the first end of the frame relative to the primary wheel set, the first support wheel set comprising a third wheel coupled toward the first side of the frame relative to the mount and a fourth wheel coupled toward the second side of the frame relative to the mount; and
        a second support wheel set coupled to the frame toward the second end of the frame relative to the primary wheel set, the second support wheel set comprising a fifth wheel coupled toward the first side of the frame relative to the mount and a sixth wheel coupled toward the second side of the frame relative to the mount, wherein
        the primary wheel set extends farther from the frame than the first support wheel set and the second support wheel set.

12. The power dolly of claim 11, wherein the primary wheel set is mounted farther from the frame than the first support wheel set and the second support wheel set.

13. The power dolly of claim 11, wherein the first wheel and the second wheel have a larger diameter than the third wheel, the fourth wheel, the fifth wheel and the sixth wheel.

14. The power dolly of claim 11, further comprising:
an adjustable-height coupling to couple the primary wheel set to the frame.

15. The power dolly of claim 14, wherein the adjustable-height coupling comprises a manually adjustable coupling.

16. The power dolly of claim 14, wherein the adjustable-height coupling comprises a powered adjustable coupling.

17. The power dolly of claim 11, wherein the plurality of wheel sets comprises tires.

18. The power dolly of claim 11, wherein the tow hitch comprises a distal end to couple the power dolly to a trailer, and the tow hitch extends from the mount at least partially towards the first end or the second end of the frame to position the distal end of the tow hitch towards the first end or the second end relative to the primary wheel set.

19. The power dolly of claim 18, wherein the tow hitch comprises a telescopic member to control the position of the distal end of the tow hitch relative to the first end and the second end of the frame.

20. The power dolly of claim 11, further comprising:
a first track and a second track coupled to the plurality of wheel sets.

21. A method comprising:
providing a frame for a power dolly, the frame comprising a first end, a second end, a first side and a second side, a lengthwise direction of the dolly being defined between the first end and the second end;
providing a mount;
providing a tow hitch to couple to the mount; and
providing a plurality of powered wheel sets to provide drive to the power dolly, the plurality of powered wheel sets comprising:
a primary wheel set coupled to the frame between the first end and the second end, the primary wheel set comprising a first wheel coupled toward the first side of the frame relative to the mount and a second wheel coupled toward the second side of the frame relative to the mount, wherein the mount is coupled to the frame to position the tow hitch lengthwise substantially between the first wheel and the second wheel;
a first support wheel set coupled to the frame toward the first end of the frame relative to the primary wheel set; and
a second support wheel set coupled to the frame toward the second end of the frame relative to the primary wheel set.

22. The method of claim 21, wherein the primary wheel set extends farther from the frame than the first support wheel set and the second support wheel set.

* * * * *